(12) United States Patent
Fertic

(10) Patent No.: US 9,938,742 B2
(45) Date of Patent: Apr. 10, 2018

(54) POOL CLEANING DEVICE

(71) Applicant: Benjamin Fertic, Belleair, FL (US)

(72) Inventor: Benjamin Fertic, Belleair, FL (US)

(*) Notice: Subject to any disclaimer, the term of this patent is extended or adjusted under 35 U.S.C. 154(b) by 0 days.

(21) Appl. No.: 15/071,583

(22) Filed: Mar. 16, 2016

(65) Prior Publication Data

US 2017/0268251 A1    Sep. 21, 2017

Related U.S. Application Data

(60) Provisional application No. 62/140,806, filed on Mar. 31, 2015.

(51) Int. Cl.
| *E04H 4/16* | (2006.01) |
| *B08B 1/00* | (2006.01) |
| *B08B 1/04* | (2006.01) |
| *B01D 33/80* | (2006.01) |
| *C02F 1/00* | (2006.01) |
| *C02F 103/42* | (2006.01) |

(52) U.S. Cl.
CPC .......... *E04H 4/1609* (2013.01); *B01D 33/80* (2013.01); *B08B 1/002* (2013.01); *B08B 1/04* (2013.01); *C02F 1/001* (2013.01); *C02F 2103/42* (2013.01)

(58) Field of Classification Search
CPC ......... E04H 4/1609; B08B 1/002; B08B 1/04; B01D 33/80; C02F 1/001; C02F 2103/42
USPC ............. 210/167.1, 167.17, 238, 470, 471
See application file for complete search history.

(56) References Cited

U.S. PATENT DOCUMENTS

| 3,188,668 | A | * | 6/1965 | Buckelew | ............ | E04H 4/1609 15/1.7 |
| 3,368,686 | A | * | 2/1968 | Petrik | .................. | E04H 4/1609 15/1.7 |
| 3,716,883 | A | * | 2/1973 | Monroe | ................ | E04H 4/1636 15/1.7 |
| 4,003,100 | A | * | 1/1977 | Whitaker | ............. | E04H 4/1609 15/1.7 |
| 4,013,563 | A | * | 3/1977 | Petrik | .................. | E04H 4/1609 15/1.7 |
| 4,152,801 | A | * | 5/1979 | Lieber | .................. | E04H 4/1609 15/1.7 |
| 4,649,589 | A | * | 3/1987 | Dibb | ..................... | E04H 4/1609 15/1.7 |
| 4,724,566 | A | * | 2/1988 | Fawcett | ................ | E04H 4/1609 15/1.7 |
| 4,846,972 | A | * | 7/1989 | Anderson | ............ | E04H 4/1609 15/1.7 |

(Continued)

*Primary Examiner* — Fred Prince
(74) *Attorney, Agent, or Firm* — Jason T. Daniel, Esq.; Daniel Law Offices, P.A.

(57) ABSTRACT

A pool cleaning device includes a debris collection member having a forward displacement unit connected thereto. The debris collection member includes a generally rectangular-shaped frame having a mesh net suspended therefrom. A pole receiver is positioned along the rear wall of the frame and interacts with a pole to receive a pushing and/or pulling force from a user. The forward displacement unit includes a leading edge member having a plurality of protrusions for disrupting debris located along a pool body. The leading edge member is suspended between a pair of extension arms which also are connected to the frame. A tensioning mechanism is positioned between each arm and the frame and secures the leading edge at a resting location that is above the frame and net.

14 Claims, 4 Drawing Sheets

(56) References Cited

U.S. PATENT DOCUMENTS

| | | | | |
|---|---|---|---|---|
| 4,994,178 | A * | 2/1991 | Brooks | E04H 4/16 15/1.7 |
| 5,422,001 | A * | 6/1995 | Yagoda | E04H 4/1609 15/1.7 |
| 5,473,786 | A * | 12/1995 | Resh | E04H 4/1609 15/1.7 |
| 5,601,715 | A * | 2/1997 | Middleton | B01D 29/05 210/469 |
| 5,915,431 | A * | 6/1999 | Doussan | E04H 4/1609 15/1.7 |
| 8,006,474 | B2 * | 8/2011 | Baker | A01D 7/06 210/238 |
| 2010/0122949 | A1 * | 5/2010 | Van Der Meijden | B25G 1/04 210/167.19 |
| 2012/0180812 | A1 * | 7/2012 | Holthusen | A46B 15/0055 134/6 |

\* cited by examiner

POOL CLEANING DEVICE

CROSS-REFERENCE TO RELATED APPLICATIONS

This application claims the benefit of U.S. Application Ser. No. 62/140,806 filed on Mar. 31, 2015, the contents of which are incorporated herein by reference.

TECHNICAL FIELD

The present invention relates generally to underwater equipment, and more particularly to a pool cleaning device.

BACKGROUND

The statements in this section merely provide background information related to the present disclosure and may not constitute prior art.

There are many known pool cleaning devices. Some of the most popular devices include the automated cleaners which utilize the suction power of the pool equipment to remove dirt from a pool floor. Another common example is a pole mounted vacuum, which requires a user to physically position the cleaning instrument at an appropriate location along the pool body. More recently, there has been the advent of so called "leaf-eating" devices which are pole mounted, but also require the use of a garden hose to create enough suction to remove large accumulations of leaves from a pool that would otherwise clog a traditional vacuum system.

Although useful in their own right, each of these devices tends to be relatively expensive and also relies on an external source to perform their jobs. As such, utilization of these devices results in ongoing operating expenses in the form of electricity and/or pressurized water. Conversely, pure mechanically operated devices do not incur ongoing operating expenses, as they do not require a hose or vacuum to operate. However, these devices such as a pole mounted brush or a skim net, for example, are not designed to lift and capture debris located on the bottom of a pool. In many instances, when one or both of these devices are used, the debris is simply scattered and pushed about the pool floor.

Accordingly, the need exists for a mechanical pool cleaning device that can effectively remove debris from the bottom of a pool or other body of water, without suffering from the drawbacks of the above noted devices.

SUMMARY OF THE INVENTION

The present invention is directed to a pool cleaning device. One embodiment of the present invention can include a debris collection member having a forward displacement unit connected thereto. The debris collection member can include a generally rectangular-shaped frame having a mesh net suspended therefrom. A pole receiver can be positioned along the rear wall of the frame and can interact with a pole to receive a pushing and/or pulling force from a user. The forward displacement unit can include a leading edge member having a plurality of protrusions for disrupting debris located along a pool body. The leading edge is connected to a pair of extension arms along each end, and the extension arms are connected to the frame.

In another embodiment, one or more tensioning mechanisms are provided to secure the leading edge at a resting location that is above the frame and net. As a force is applied onto the device from the pole, the leading edge moves along the ground and disrupts the debris which gets captured by the frame and net.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
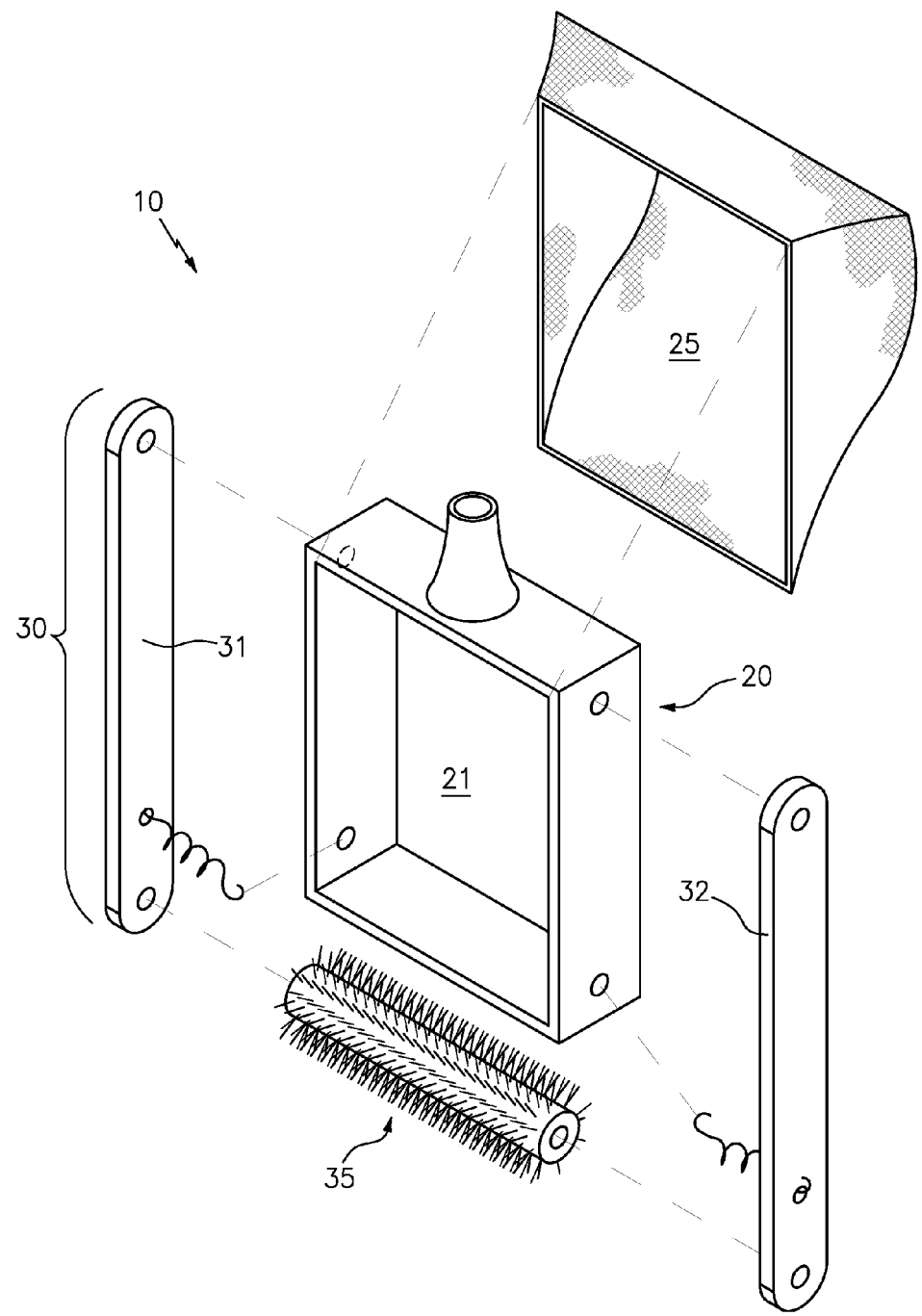
FIG. 1 is an exploded parts view of a pool cleaning device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, the terms "pivotally connected," "rotatably secured," and derivatives thereof shall be used interchangeably to describe a situation wherein two or more objects are joined together in a manner that allows one or both of the objects to pivot and/or rotate, respectively, about or in relation to the other object. Several nonlimiting examples include a shaft and bearings assembly, traditional single hinge mechanisms, adjustable position locking hinges, pivoting couplers, and/or swivel flanges, for example.

As described herein, the terms "connector," "complementary connector" and derivatives thereof can include any number of different elements capable of securing two items together in either a permanent or nonpermanent manner. Several nonlimiting examples include opposing strips of hook and loop material (i.e. Velcro®), magnetic elements, tethers such as straps and ties, and compression fittings such as hooks, snaps and buttons, for example. Each illustrated connector and complementary connector can be permanently secured to the illustrated portion of the device via a permanent sealer such as glue, adhesive tape, or welds, for example.

FIGS. 1-4 illustrate various embodiments of a pool cleaning device. Although described as including particular construction elements and materials, and as for being used in conjunction with a swimming pool, the inventive concepts disclosed herein are not so limiting. In this regard, the below described device can include any number of different shapes, sizes, construction materials and/or components, as will be useful for engaging debris or other such matter located within any body of water.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 4.

FIG. 1 illustrates an exploded parts view of one embodiment of a pool cleaning device 10 that is useful for understanding the inventive concepts disclosed herein. As shown, the device 10 can include, essentially, a debris collection member 20, and a forward displacement unit 30.

Figure 2:
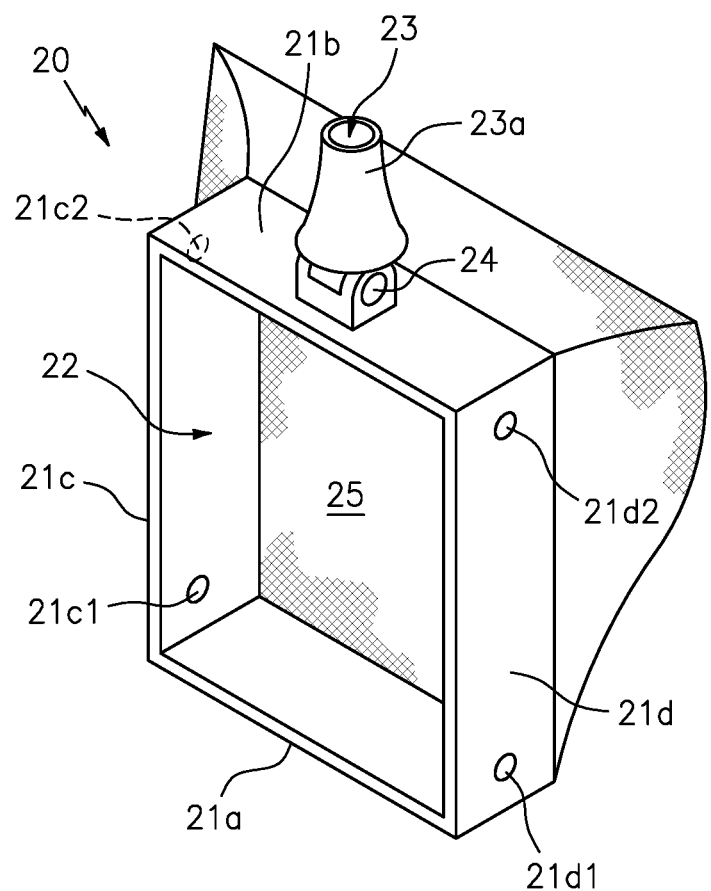
FIG. 2 is a perspective view of the debris collection member of the pool cleaning device in accordance with one embodiment of the invention.

As shown best in FIG. 2, the debris collection member can include a generally rigid frame having a net which can function together to collect debris from the pool floor that is disrupted by the leading edge. In one embodiment, the frame 21 can include a generally rectangular shaped member having a front wall 21a, a rear wall 21b, and a pair of side walls 21c and 21d that define a central opening 22. As shown, a pair of front openings 21c1 and 21d1 can be disposed along each of the side walls to receive the springs 33a and 33b described below. Likewise, complementary connectors 21c2 and 21d2 can be disposed along each of the side walls to receive additional connectors 5 for mating the frame with the extension arms of the displacement unit.

A receptacle 23 having a central opening 23a can be positioned along the rear wall 21b. The receptacle can function to receive a traditional pool pole or other such member so as to receive a pushing force from the same. In various embodiments, the receptacle 23 can include a hinged connector 24 so as to be pivotally mounted onto the rear wall, in order to allow a user to adjust an angle at which the pole and frame are connected.

The frame is preferably constructed from a lightweight, rigid and durable material that is suitable for prolonged exposure to water. In the preferred embodiment, the frame 21 can be constructed from a single piece of reinforced polymer plastic, however other construction materials are also contemplated. Although described above as including a generally rectangular shaped frame, this is for illustrative purposes only, as the frame can include any number of different shapes and sizes.

A net 25 can be positioned within the central opening 22 and can be secured along each wall of the frame 21 in accordance with known manufacturing techniques. The net can preferably be constructed from a fine nylon-mesh fabric, however any number of other materials having excellent tensile strength that are suitable for prolonged exposure to water are also contemplated. In the preferred embodiment, the net can extend below the bottom surface of the frame. In this regard, as the frame moves the net through the pool, the net can function as a scoop for trapping any debris such as leaves, dirt, sticks and insects, for example, while allowing water to pass therethrough. Of course, other embodiments wherein the net does not extend beneath the frame and/or is secured across the opening in a taught manner are also contemplated.

Figure 3:
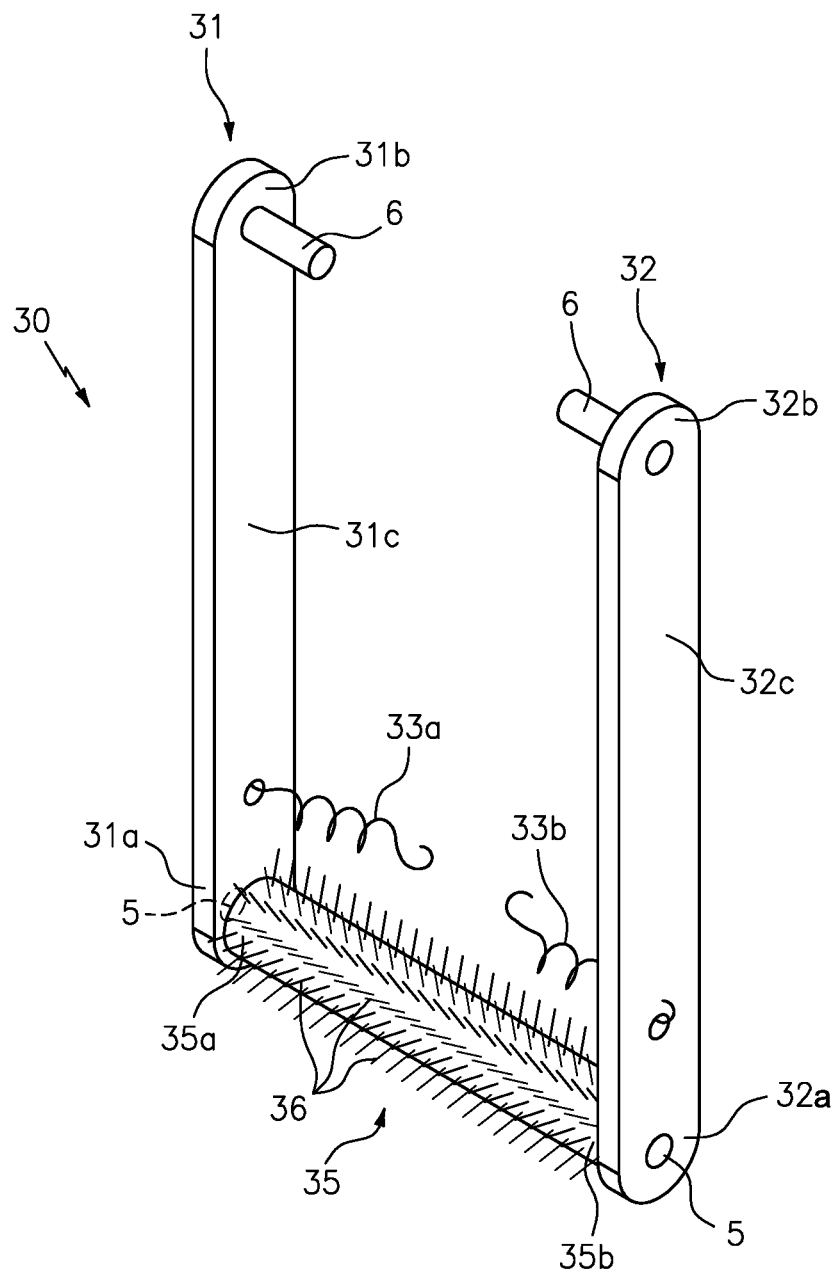
FIG. 3 is a side view of the forward displacement unit of the pool cleaning device in accordance with one embodiment of the invention.

FIG. 3 illustrates one embodiment of the forward displacement unit 30, that includes first and second extension arms 31 and 32, that extend outward from a leading edge member 35. As will be described below, the extension arms 31 and 32 can function to position the leading edge member 35 a set distance from the front wall of the frame 21a, so as to allow the leading edge member to disrupt debris on the pool floor for capture by the net 25.

As shown, each extension arm 31 and 32 can include an elongated member having a first end 31a and 32a, a second end 31b and 32b, and a middle section 31c and 32c, respectively. Each of the arms can be constructed from any number of rigid materials such as plastic, for example. A pair of tensioning mechanisms 33a and 33b such as springs, for example, can be affixed along the middle sections of each of the extension arms 31c and 32c, respectively, and can function to engage the frame openings 21c1 and 21d1, as described below. Of course, the device is not limited to the use of coiled springs, and openings along the frame member, as any number of other devices having a generally resilient nature, along with any type of connection means can also be utilized herein. In various embodiments, the tensioning mechanisms 33a and 33b can include commercially available adjustable springs, so as to allow a user to adjust the tension applied by the mechanism.

The leading edge member 35 can also include an elongated member that is preferably constructed from rigid plastic. The leading edge member can include a first end 35a and a second end 35b that is connected to the first ends of the extension arms 31a and 32a, respectively, so as to position the leading edge at a generally orthogonal angle to each of the arms. The leading edge can be either permanently or removably secured to the extension arms utilizing any type of known connectors 5 such as compression fittings e.g., nut and bolt, roller attachment, with central rod, lock snap mechanisms, etc., for example, or can be formed with the extension arms at a time of construction so as to create a unitary device. Moreover, the leading edge member can include a fixed orientation (e.g., does not move) or can be rotatably secured to the extension arms so as to roll along the pool body (e.g., rotatably secured).

The leading edge 35 can include any number of different shapes such as the illustrated cylindrical shape, for example, which can rub or roll along the pool bottom. Additionally, the leading edge can include any number of protrusions 36 such as rubber nubs, for example, which can be arranged into any pattern so as to interact with the water and the pool bottom to create an updraft/vortex motion within the water as the leading edge moves across the pool floor. Such a feature can allow the momentum of the device to physically lift debris from the pool floor wherein it can be captured by the net.

In another embodiment, the protrusions along the leading edge can comprise a plurality of bristles which can scrape the pool floor. Such a feature can allow the leading edge to also act as a brush which can disrupt not only debris, but also fine sand and dirt that would traditionally only be captured by a vacuum device.

Although described as including a single leading edge member, other embodiments are contemplated wherein any number of different leading edge members can be utilized with the other device components. Such members can be sold separately, or can be included as a kit with the device itself. In either instance, such a feature can allow a user to interchangeably utilize any number of different leading edges, each of which being constructed to include any number of different shapes, sizes (e.g., diameters) and construction materials that are designed to perform different jobs and/or to be utilized with different pool surfaces such as concrete, marcite, diamond finish, fiberglass, and/or vinyl (typically used for above ground pools), for example.

Figure 4:
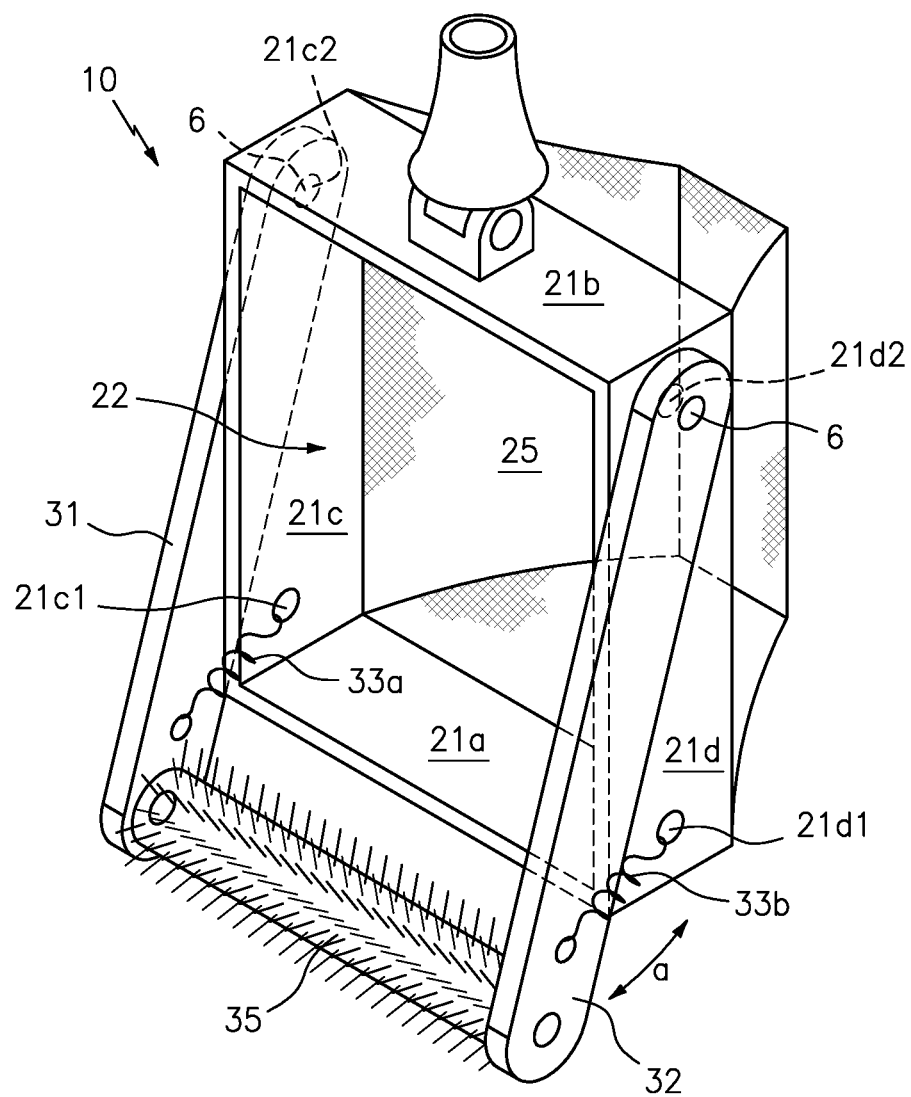
FIG. 4 is a perspective view of the pool cleaning device in accordance with one embodiment of the invention.

FIG. 4 illustrates one embodiment of the assembled pool cleaning device 10. As shown, connectors 6 located along the second ends of the first and second arms 31b and 32b can engage the complementary connectors 21c2 and 21d2, respectively, so as to pivotally secure the second ends of the arms 31 and 32 to the frame 21. Likewise, the distal ends of the tensioning mechanisms 33a and 33b can engage the openings 21c1 and 21d1, respectively of the frame. When so positioned, the leading edge member 35 is at a resting location that is above the frame 21 and net 25.

In this regard, when a force sufficient to overcome the resistance of the springs is applied, the extension arms can pivot (see arrow a), thereby increasing and decreasing a separation distance between the leading edge 35 and the front wall of the frame 21a, which are generally parallel to one another. Such a feature also functions to increase or decrease the surface area of the net 25 trailing behind the leading edge 35.

In operation, once the receptacle 23 is secured to a pole, the device 10 can be placed onto any wall of a swimming pool, and pushed across the surface thereof. As the device is pushed, a downward force is applied by the pole, thereby ensuring firm contact between the pool wall and the leading edge 35. At this time, the irregular and hydrodynamicly unfriendly protrusions along on the leading edge function to agitate the water as it engages the pool body, thus causing a disturbance which acts upon the pool body and any debris located thereon. This agitation and disturbance to agitate functions to lift any such debris from the pool floor and is immediately captured by the net. In this manner, the springs located along each of the extension arms function to maintain a steady pressure on the leading edge member, and further function to maintain the frame/net and leading edge at an optimum angle for debris recovery. The optimal angle will typically be between 15 and 90 degrees movement of the extension arms relative to the frame wall to which they are attached.

Accordingly, the above described pool cleaning device provides a new and innovative device that is capable of effectively removing debris from a body of water, without requiring a hose or vacuum system.

As described herein, one or more elements of the pool cleaning device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A pool cleaning device, comprising:
   a frame having a front wall, a rear wall, a first side wall, and a second side wall that define a central opening;
   a net that is in communication with the frame and is disposed within the central opening;
   a first and second extension arms, each of the extension arms includes a first end and a second end; and
   a leading edge member that is coupled with the first ends of the first and second extension arms,
   wherein the second end of the first extension arm is pivotally secured with the first side wall of the frame at a location adjacent to the rear wall,
   wherein the second end of the second extension arm is pivotally secured with the second side wall of the frame at a location adjacent to the rear wall, and
   wherein the net includes a size that extends beneath the frame.

2. The device of claim 1, further comprising:
   a pole receptacle that is positioned along the rear wall of the frame, said receptacle having a central opening for receiving a pool pole.

3. The device of claim 1, wherein the net is secured taught to each wall, and does not extend beneath the frame.

4. The device of claim 1, further comprising:
   a first tensioning mechanism that is in communication with each of the first extension arm and the first side wall; and
   a second tensioning mechanism that is in communication with each of the second extension arm and the second side wall.

5. The device of claim 4, wherein the tensioning mechanisms function to limit a rotation of the first and second extensions arms to a range of between approximately 15 and 90 degrees relative to the first and second side walls to which the first and second extension arms are attached.

6. The device of claim 4, wherein each of the first and second tensioning mechanisms comprise a spring.

7. The device of claim 1, further comprising:
   a plurality of protrusions that are disposed along the leading edge member.

8. The device of claim 7, wherein the plurality of protrusions include bristles forming a brush.

9. The device of claim 1, wherein the leading edge member is fixedly connected to each of the first and second extension arms.

10. The device of claim 1, wherein the leading edge member is rotatably secured between the first and second extension arms, and is configured to roll along a pool body.

11. A pool cleaning device, comprising:
- a frame having a front wall, a rear wall, a first side wall, and a second side wall that define a central opening;
- a net that is in communication with the frame and is disposed within the central opening;
- a first and second extension arms, each of the extension arms includes a first end and a second end;
- a first tensioning mechanism that is in communication with each of the first extension arm and the first side wall;
- a second tensioning mechanism that is in communication with each of the second extension arm and the second side wall; and
- a leading edge member that is coupled with the first ends of the first and second extension arms,
- wherein the second end of the first extension arm is pivotally secured with the first side wall of the frame at a location adjacent to the rear wall, and
- wherein the second end of the second extension arm is pivotally secured with the second side wall of the frame at a location adjacent to the rear wall.

12. The device of claim 11, wherein the tensioning mechanisms function to limit a rotation of the first and second extensions arms to a range of between approximately 15 and 90 degrees relative to the first and second side walls to which the first and second extension arms are attached.

13. The device of claim 11, wherein each of the first and second tensioning mechanisms comprise a spring.

14. A pool cleaning device, comprising:
- a frame having a front wall, a rear wall, a first side wall, and a second side wall that define a central opening;
- a net that is in communication with the frame and is disposed within the central opening;
- a first and second extension arms, each of the extension arms includes a first end and a second end;
- a leading edge member that is coupled with the first ends of the first and second extension arms; and
- a plurality of protrusions that are disposed along the leading edge member,
- wherein the second end of the first extension arm is pivotally secured with the first side wall of the frame at a location adjacent to the rear wall, and
- wherein the second end of the second extension arm is pivotally secured with the second side wall of the frame at a location adjacent to the rear wall.

* * * * *